United States Patent
Hollar et al.

(10) Patent No.: US 10,863,314 B2
(45) Date of Patent: Dec. 8, 2020

(54) METHODS FOR GENERATING A LAYOUT OF A PARTICULAR ENVIRONMENT UTILIZING ANTENNAS AND A MOBILE DEVICE

(71) Applicant: Wiser Systems, Inc., Raleigh, NC (US)

(72) Inventors: Seth Edward-Austin Hollar, Raleigh, NC (US); Ryan Michael Tedrick, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 0 days.

(21) Appl. No.: 16/257,170

(22) Filed: Jan. 25, 2019

(65) Prior Publication Data

US 2019/0246241 A1 Aug. 8, 2019

Related U.S. Application Data

(60) Provisional application No. 62/621,802, filed on Jan. 25, 2018.

(51) Int. Cl.
*H04W 4/029* (2018.01)
*H04W 4/33* (2018.01)

(52) U.S. Cl.
CPC ............. *H04W 4/029* (2018.02); *H04W 4/33* (2018.02)

(58) Field of Classification Search
CPC ................................ H04W 4/029; H04W 4/33
See application file for complete search history.

(56) References Cited

U.S. PATENT DOCUMENTS

| 10,064,012 B1 * | 8/2018 | Boston ................... H04W 4/023 |
| 2017/0303089 A1 * | 10/2017 | Wang ..................... H04W 4/025 |
| 2019/0086212 A1 * | 3/2019 | Koshy ..................... G01C 21/32 |

FOREIGN PATENT DOCUMENTS

WO    WO-2012154926 A2 * 11/2012 ............... G01S 1/72

* cited by examiner

*Primary Examiner* — Marisol Figueroa
(74) *Attorney, Agent, or Firm* — Stanek Lemon Crouse & Meeks, PA

(57) ABSTRACT

Methods for creating a location map using antennas in an ultra-wide band (UWB) network including positioning a plurality of stationary antennas in a target environment; determining a position of each of the plurality of stationary antennas relative to one another; obtaining location measurements relative to a mobile device as it moves around the target environment; generating a location map using the location measurements, the location map illustrating a path traveled by the mobile device relative to the plurality of stationary antennas; and displaying the location map including straight line segments corresponding to the path traveled by the mobile device.

20 Claims, 7 Drawing Sheets

METHODS FOR GENERATING A LAYOUT OF A PARTICULAR ENVIRONMENT UTILIZING ANTENNAS AND A MOBILE DEVICE

CLAIM OF PRIORITY

The present application claims priority to U.S. Provisional Application Ser. No. 62/621,802, filed Jan. 25, 2018 entitled Methods for Generating a Layout of a Particular Environment Utilizing Antennas and a Mobile Device, the disclosure of which is hereby incorporated herein by reference as if set forth in its entirety.

FIELD

This present inventive concept relates generally to mapping and, more particularly, to utilizing antennas and mobile devices in a wireless system and related method and devices.

BACKGROUND

In the early 2000s, ultra-wideband (UWB) was cited as a promising technology as "wireless universal serial bus (USB)". However, the market turned in a different direction. Nonetheless, the groundwork from the Federal Communications Commission (FCC) was laid so that devices could operate legally in the United States and abroad. Until recently, UWB devices operating in the 3.1 to 10 GHz range tended to be composed of discrete components having a relatively high price point. Recently, however, UWB integrated circuit (IC) chips have come into the marketplace allowing for lower cost UWB transceivers to be built and sold. With the lower price point, these devices may reach a broader audience with greater manufacturing quantities.

Inherent in UWB technology is the ability to create narrow pulse widths. These pulse widths can be used to establish an arrival time of a radio frequency (RF) signal with very high granularity. A precise timestamp can be determined for receiving a signal and transmitting a signal. When timestamps are compared for a message that is sent from one device to the next, a distance between devices can be calculated based on the difference in time and the speed of the signal through the air. This information can be used to provide location information with respect to devices in the UWB network.

SUMMARY

Some embodiments of the present inventive concept provide methods for creating a location map using antennas in an ultra-wide band (UWB) network. The method includes positioning a plurality of stationary antennas in a target environment; determining a position of each of the plurality of stationary antennas relative to one another; obtaining location measurements relative to a mobile device as it moves around the target environment; generating a location map using the location measurements, the location map illustrating a path traveled by the mobile device relative to the plurality of stationary antennas; and displaying the location map including straight line segments corresponding to the path traveled by the mobile device.

In further embodiments, the displayed location map may be manually edited to select, remove and/or reposition the straight line segments.

In still further embodiments, locations of objects in the target environment may be assigned on the location map and the assigned location information may be stored in metadata associated with the location map.

In some embodiments, map details may be automatically determined based on relative positioning of the straight line segments on the displayed location map.

In further embodiments, a visual map may be created using straight line segment data, line segment metadata and object location metadata.

In still further embodiments, the location map may be marked as the mobile device moves around the target environment to create metadata stored with the location map.

In some embodiments, the metadata may relate to physical features of the target environment.

In further embodiments, the target environment may be one of an indoor environment and an outdoor environment.

In still further embodiments, location measurements may be obtained as the mobile device moves around walls, furnishings and other elements in the target environment.

In some embodiments, the mobile device may be carried by a user and/or positioned on a remote controlled device and operated from a remote location.

Related systems and computer program products are also provided.

DETAILED DESCRIPTION

Figure 1:
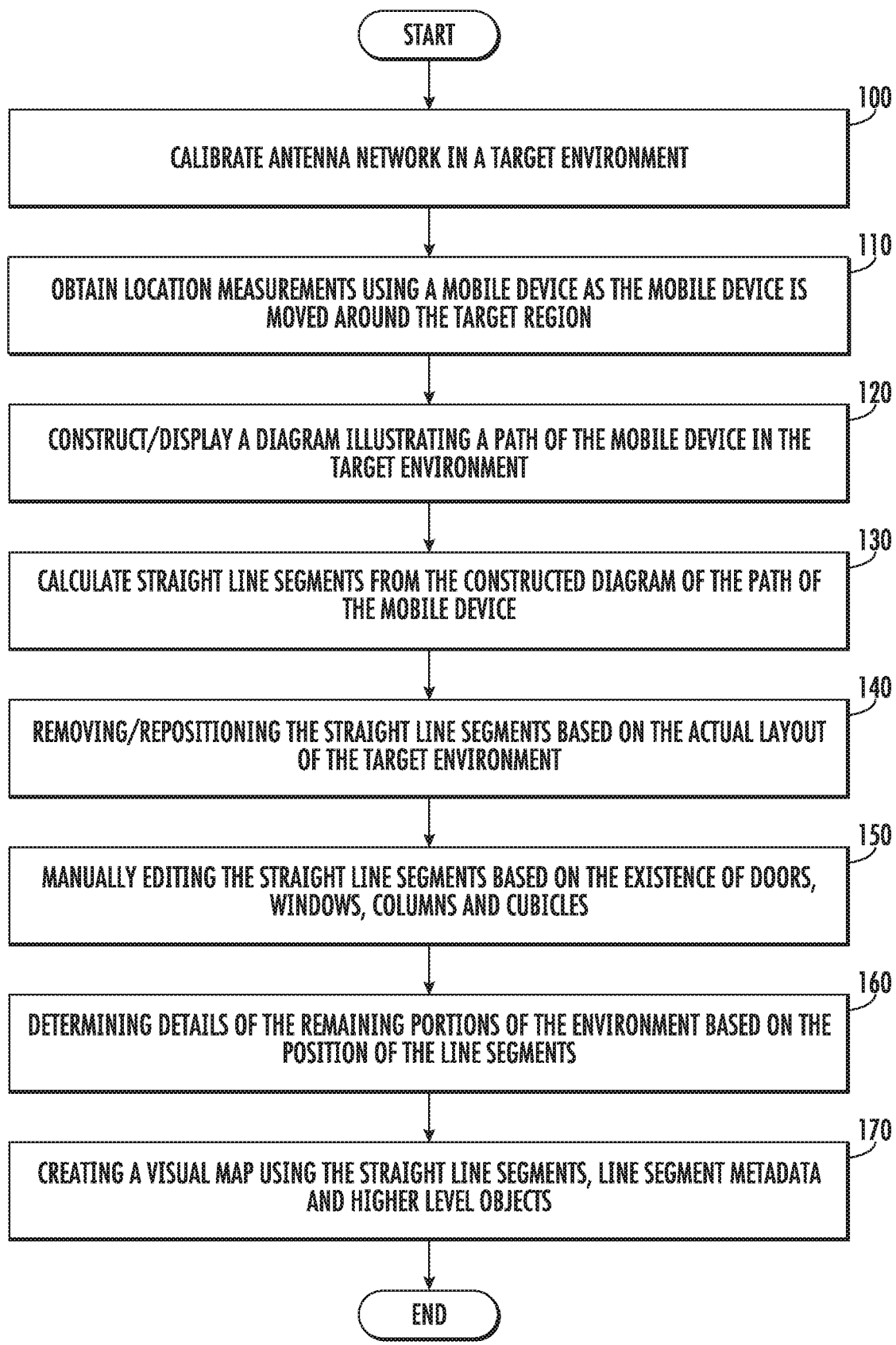
FIG. 1 is a flowchart illustrating methods in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, inherent in UWB technology is the ability to create narrow pulse widths. These pulse widths can be used to establish an arrival time of a radio frequency (RF) signal with very high granularity. A precise timestamp can be determined for receiving a signal and transmitting a signal. When timestamps are compared for a message that is sent from one device to the next, a distance between devices can be calculated based on the difference in time and the speed of the signal through the air. As will be discussed below with respect to some embodiments of the present inventive concept, this location information can be used to create a map of an environment in which a device(s) is moving as will be discussed with respect to FIGS. 1 through 10 below.

Referring first to the flowchart of FIG. 1, methods for creating a map/layout of a specific environment in accordance with some embodiments of the present inventive concept will be discussed. A specific environment is chosen. This environment can be any environment a user chooses. For example, the environment may be an office, an arena, a green house or the like without departing from the scope of the present inventive concept. The environment can be either indoor or outdoor without departing from the scope of the present inventive concept. For example, embodiments of the present inventive concept may be used to outline building footprints, fences, or any other physical body that can act as a barrier or wall of some sort. In some embodiments, the inventive concept could be used to map the location and size of outbuildings on a property as well as the size of other large objects, such as the diameter of trees or edges of a driveway. Similarly, embodiments discussed herein could be used to map the topology of the land, where the height data of the mobile antenna is used as opposed to the X and Y coordinate data used for mapping walls and objects.

Once the environment to be mapped is chosen (target environment), antennas may be placed in the environment and calibrated (block 100). As used herein, the term "calibration" refers to the act of determining positions of antennas relative to one another or to another reference, for example, a map. Thus, antenna locations are known relative to one another. Many methods of calibration can be used without departing from the scope of the present inventive concept. In some embodiments, auto-calibration methods may be used to calibrate antennas in accordance embodiments discussed herein. Auto-calibration is discussed in commonly assigned U.S. patent Ser. No. 16/257,309; PR Serial No. 62/621,833), filed Jan. 25, 2018, the disclosure of which is hereby incorporated herein by reference as if set forth in its entirety. This patent application is provided for example only and, therefore, embodiments of the present inventive concept is not limited thereto.

For example, calibration can be performed manually. In particular, since the antennas know the relative distances between each other, for example, using ranging measurements, there generally exists only a single configuration of antennas. Positioning this configuration relative to a map or reference point or in the correct plane is the part of calibration where the user provides input.

Figure 2:
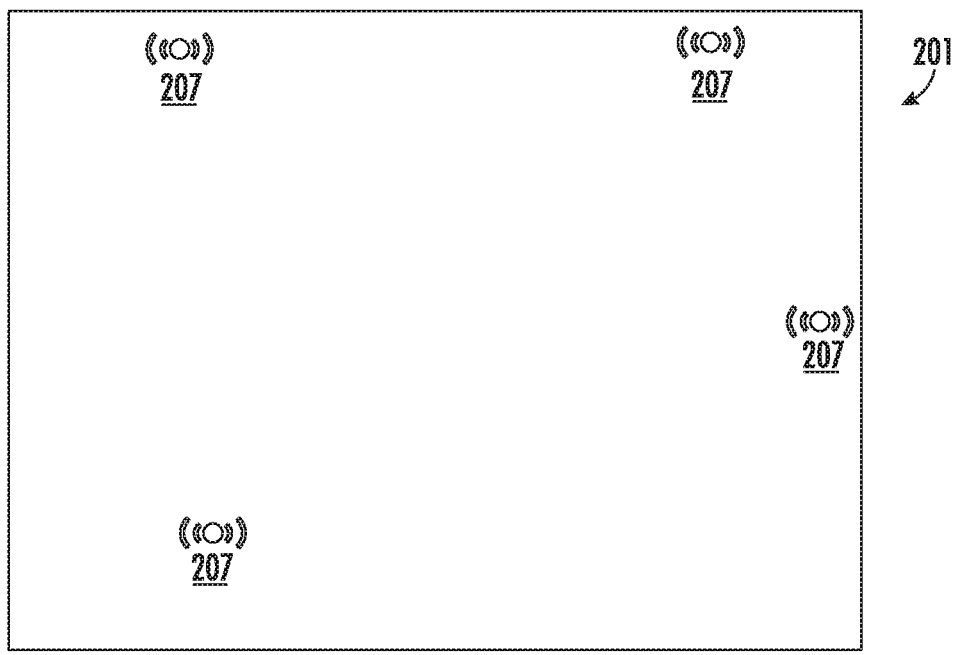
FIGS. 2 through 8 are diagrams illustrating various steps in methods in accordance with some embodiments of the present inventive concept.

In some embodiments, the network may be a real time location system (RTLS) network, however, embodiments of the present inventive concept are not limited to this configuration. FIG. 2 illustrates a target environment 201 having a plurality of antennas 207 therein, each of the antennas being calibrated as discussed above such that the antenna locations are known relative to one another.

Once the system in calibrated, location measurements are made with respect to a mobile device M that moves around the environment 201 (block 110). It will be understood that there are different ways that location measurements can be made. For example, location measurements may be made by trilateration of the mobile device's location relative to the fixed devices or triangulation of the mobile device's location relative to the fixed devices. Each antenna may calculate the relative location of the mobile device. Alternatively, each antenna may calculate a specific piece of information that is used by the device to perform the location calculation. However, embodiments of the present inventive concept may use any method of location measurement that can feasibly be used within the lines of the present inventive concept. For example, location measurements are discussed in commonly assigned U.S. patent application Ser. No. 15/767,522, the disclosure of which is hereby incorporated by reference as if set forth in its entirety.

Figure 3:
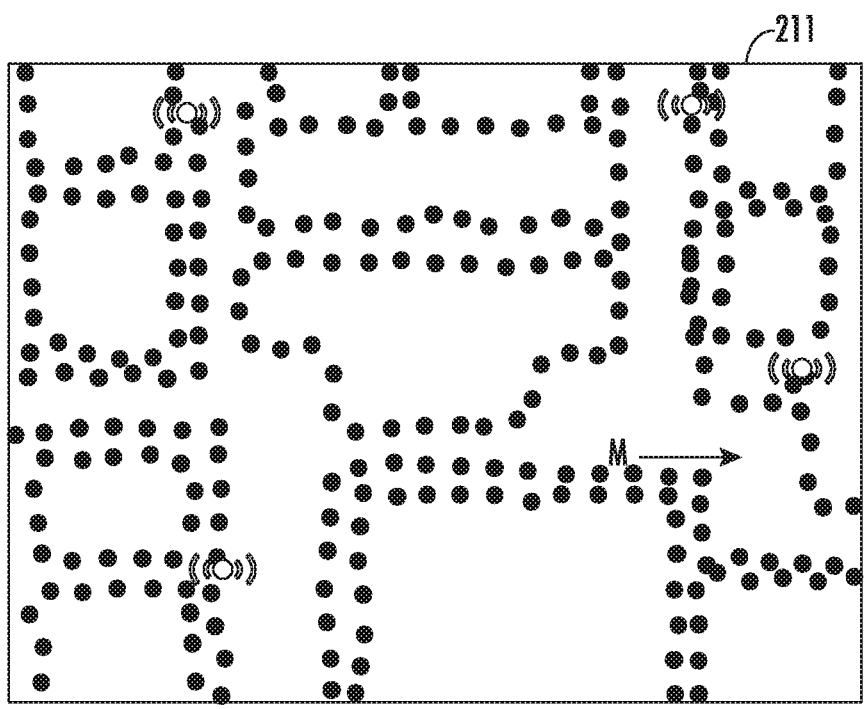

It will be understood that although only a single mobile device M is illustrated in FIG. 3, more than one mobile device M may be present without departing from the scope of the present inventive concept. To obtain an accurate map, in some embodiments, the mobile device M may be moved around the walls of the target environment and various other features therein. For example, a person may walk around holding the mobile device M in their hand or the mobile device may be placed on an object that can be driven around the target environment remotely. When all of the location measurements are complete, a map 211 illustrated in FIG. 3 may be generated showing the path of the mobile device traveled relative to the stationary antennas 207 (block 120).

In particular, if the user has specific instructions on how to move around the environment, for example, the user is told only to walk next to walls, or if the system is setup to make inferences about the environment based on the user's movement, in some embodiments, the system can make determinations on the existence and the nature of objects and structures within the environment.

By taking the location data, the system can infer that multiple location measurements that are in a straight line are along a wall. By noting that two wall constructs are separated by some distance, say less than a foot, the system can infer that the user moved along two sides of wall and can use that data for room placement. If the user was instructed to hold the mobile device against the wall, then wall thickness may also be determined. Alternatively, the user could input a measurement for wall thickness that the system would use to assist in wall placement. For non-wall objects, the system is configured to note the objects' locations, perhaps offering a best guess as to the nature of the object. The user may then place objects in the space based off of a library of common objects such as cubicles, doors, windows, tables, sofas, desks, etc.

Figure 4:
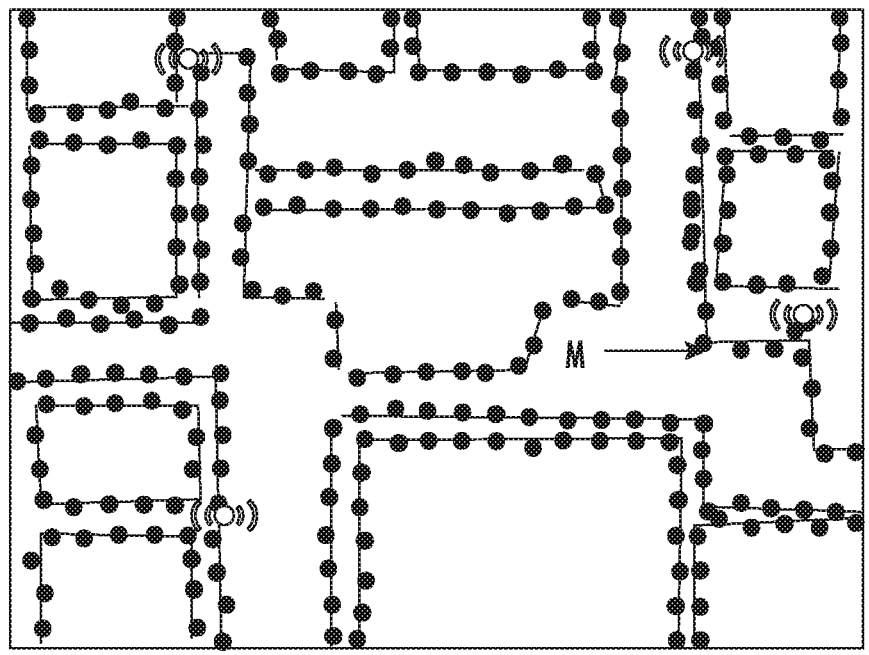

Straight line segments as shown in FIG. 4 may be calculated and displayed based on the path of the mobile device M (block 130). For example, in some embodiments, points may be generated as a user moves the mobile device around a space. There may be intrinsic knowledge about the order in which the points are generated and, thus, an educated guess may be made about which points might likely be in a line. A best fit line may be generated for any arbitrary series of points, then a fitness function may be used to determine how well the points fit the given line. If the line fits sufficiently well, it can be determined that the points can reasonably be represented using the line and then that line can later be used in the calculation of wall and object positions.

In some embodiments, the mobile device M may include the capability to mark the map when the mobile device moves from room to room. This function is configured to create metadata that will appear later in the created map. Other metadata could signify other details, for example, physical features of the target environment such as an outline of a column, a door, windows, and the like.

Figure 5:
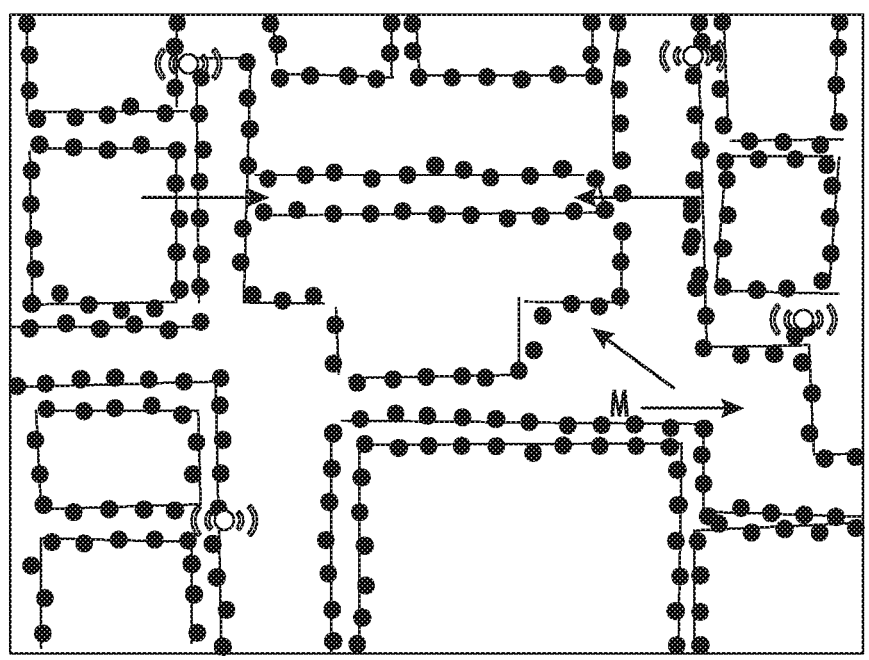
Figure 6:
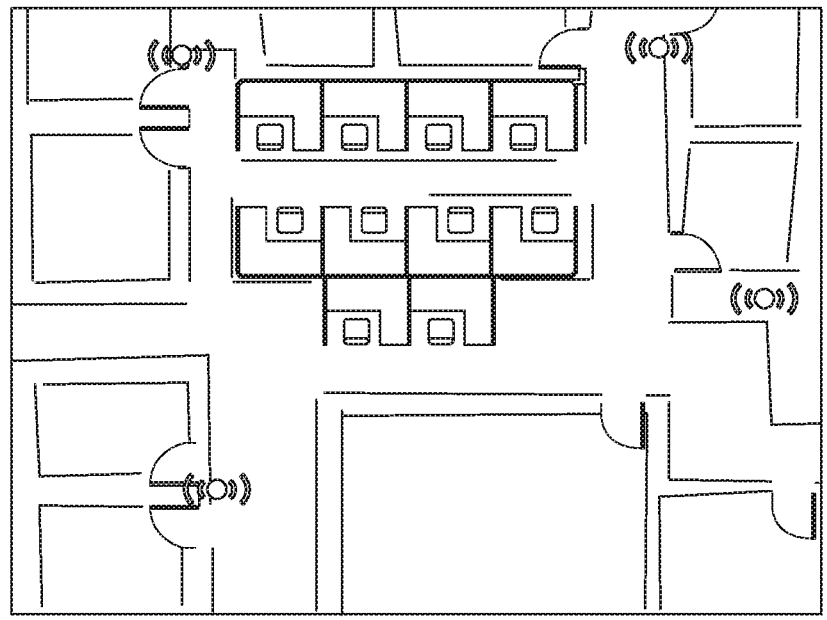

A user may manually edit the straight line drawing of FIG. 4 to select, remove, and reposition etc. erroneous line segments (block 140) as shown in FIG. 5. In some embodiments, there will be a user interface, for example, a graphical user interface, that may be used to move, reshape, label and the like. However, in some embodiments, the system may respond to voice commands or a stylus without departing from the scope of the present inventive concept. In some embodiments, the user may assign the locations of common objects to the map of the room, such as doors, windows, columns, cubicles and the like (block 150) as shown in FIG. 6. This metadata may be saved along with the map file.

Figure 7:
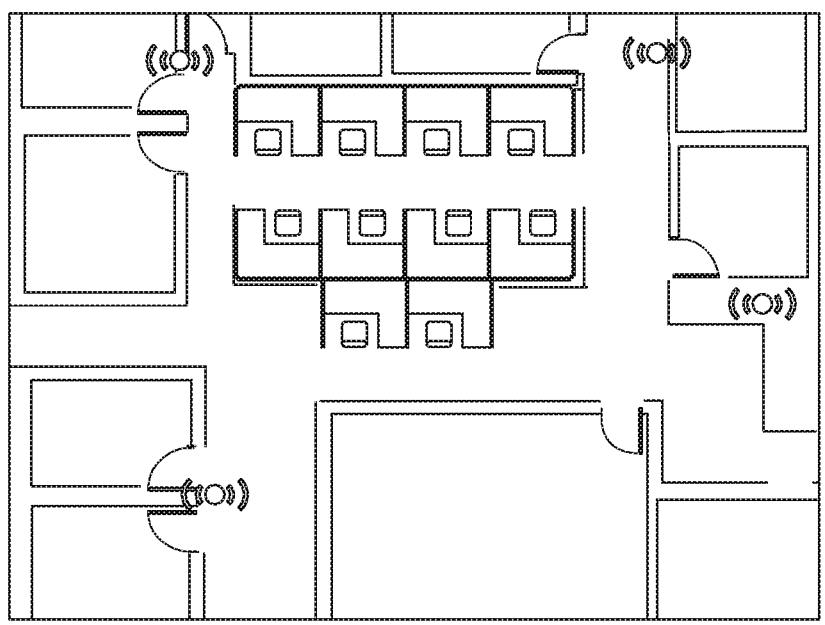

In some embodiments, it may be determined if a room exists, as well as if two paths are opposite sides of a shared wall (block 160). For example, if there are four line segments nearly enclosing an area, then the system may be configure to recognize this feature and ascribe a room property to the area enclosed by the line segments. If that room is bordered by another room, the lines may be combined into a wall as illustrated in FIG. 7.

Figure 8:
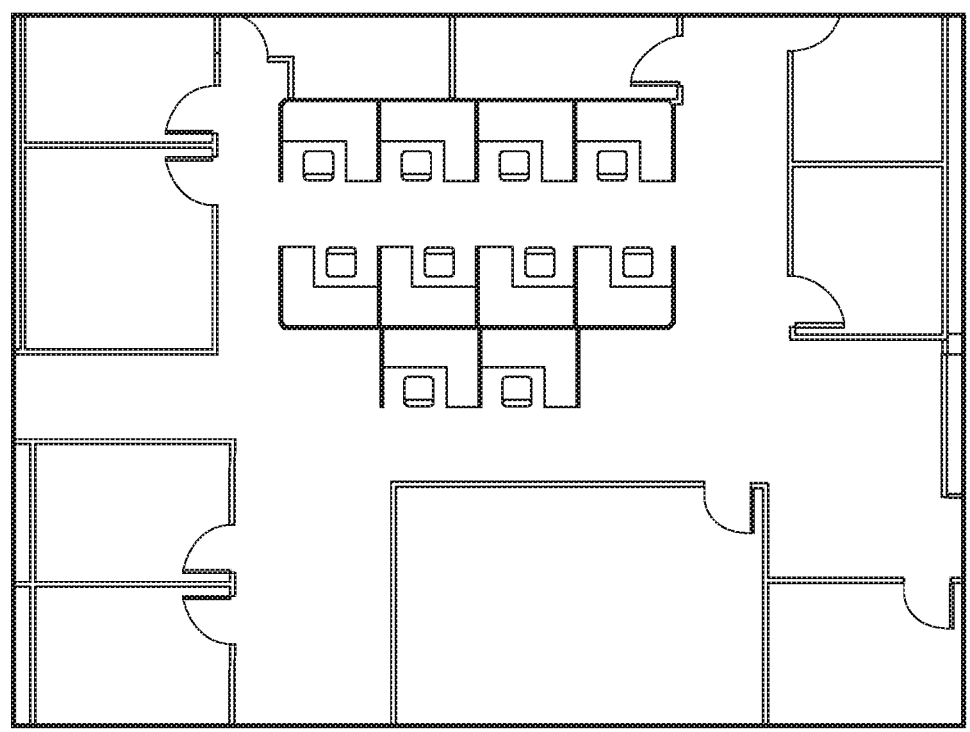

A visual map is created with these straight line segments, line segment metadata, and higher level objects (block 170) as illustrated in FIG. 8. Thus, embodiments of the present inventive concept may use location signals to generate a map of a target environment as briefly discussed herein.

Figure 9:
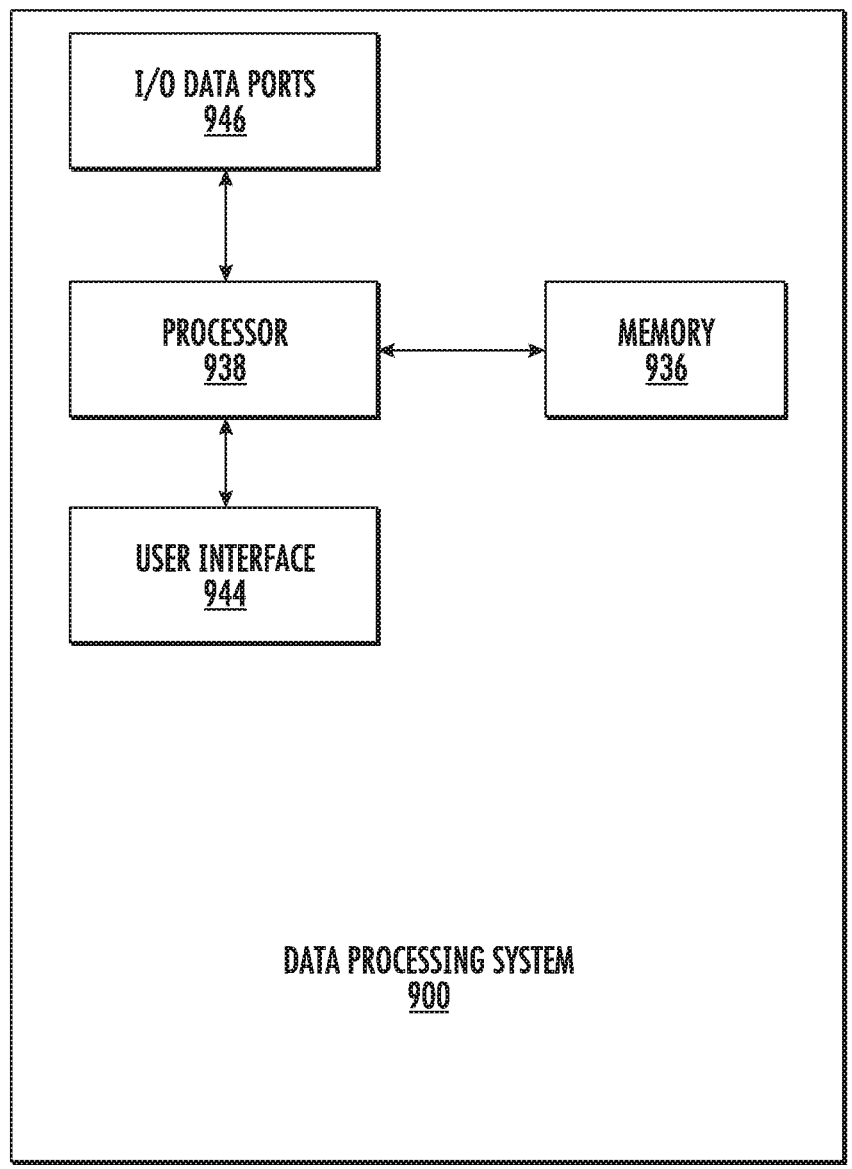
FIG. 9 is a block diagram of a data processor that may be used in conjunction with some embodiments of the present inventive concept.

Referring now to FIG. 9, an exemplary embodiment of a data processing system 900 suitable for use in accordance with some embodiments of the present inventive concept will be discussed. For example, the data processing system 900 may be provided to perform the algorithms and calculations to create the map as discussed in accordance with embodiments of the present inventive concept. As illustrated in FIG. 9, the data processing system 900 includes a user interface 944 such as a display, a keyboard, keypad, touchpad or the like, I/O data ports 946 and a memory 936 that communicates with a processor 938. The I/O data ports 946 can be used to transfer information between the data processing system 900 and another computer system or a network. These components may be conventional components, such as those used in many conventional data processing systems, which may be configured to operate as described herein. This data processing system 900 may be included any type of computing device without departing from the scope of the present inventive concept.

Figure 10:
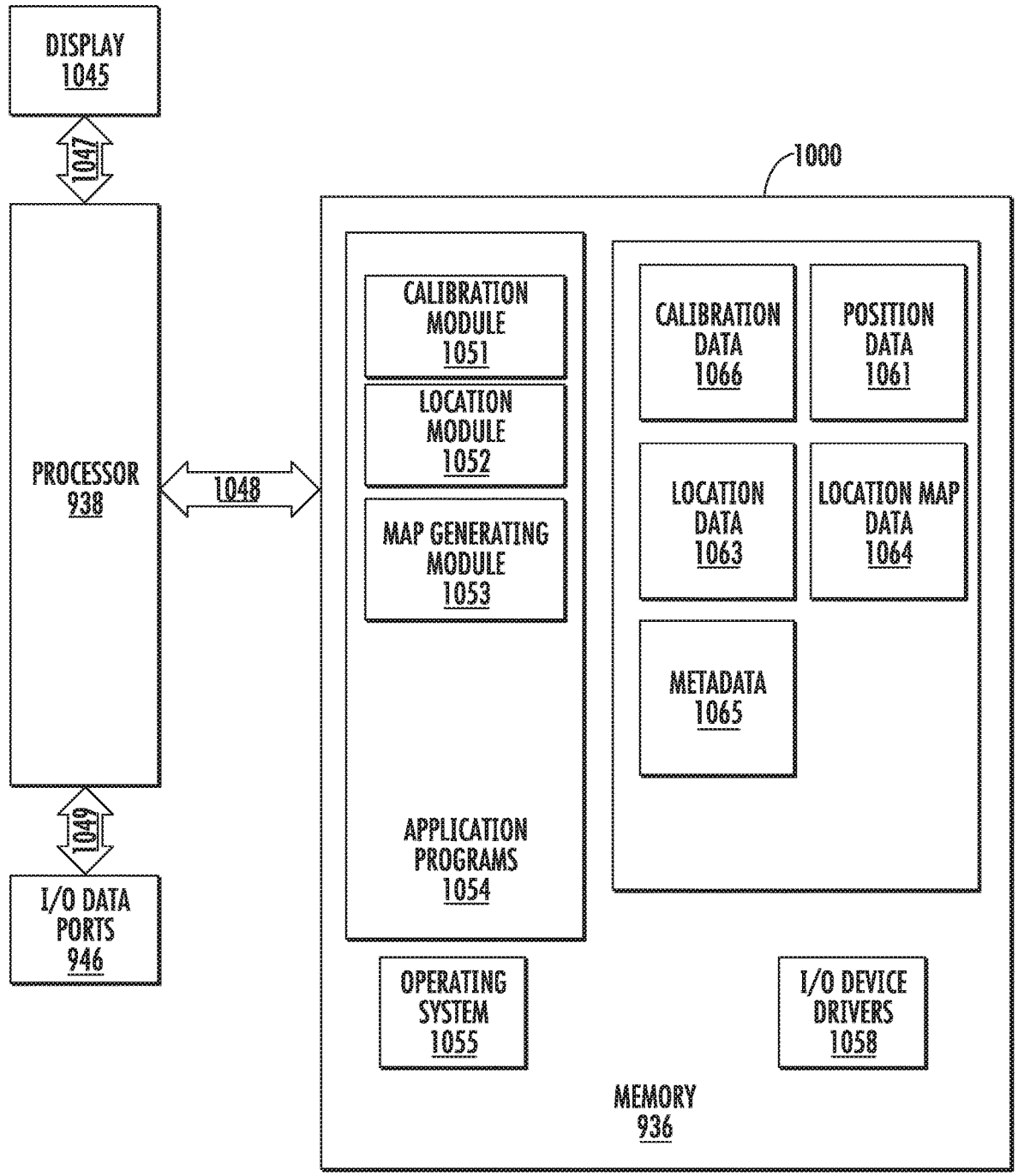
FIG. 10 is a more detailed block diagram of the data processor of FIG. 9 in accordance with some embodiments of the present inventive concept.

Referring now to FIG. 10, a more detailed block diagram of the data processing system 900 in accordance with some embodiments of the present inventive concept will be discussed. The processor 938 communicates with a display 1045 via and address/data bus 1047, the memory 936 via an address/data bus 1048 and the I/O data ports 946 via an address/date bus 1049. The processor 938 can be any commercially available or custom microprocessor or ASICs. The memory 936 is representative of the overall hierarchy of memory devices containing the software and data used to implement the functionality of the data processing system 900. The memory 936 can include, but is not limited to, the following types of devices: cache, ROM, PROM, EPROM, EEPROM, flash memory, SRAM, and DRAM.

As shown in FIG. 10, the memory 936 may include several categories of software and data used in the data processing system 900: an operating system 1055; application programs 1054; input/output (I/O) device drivers 1058; and data 1056. As will be appreciated by those of skill in the art, the operating system 1055 may be any operating system suitable for use with a data processing system, such as OS/2, AIX or zOS from International Business Machines Corporation, Armonk, N.Y., Windows95, Windows98, Windows2000, WindowsXP, Vista, Windows 7, Windows 8 or Windows 10 from Microsoft Corporation, Redmond, Wash., Unix, Linux, LabView, or a real-time operating system such as QNX or VxWorks, or the like. The I/O device drivers 1058 typically include software routines accessed through the operating system 1055 by the application programs 1054 to communicate with devices such as the I/O data port(s) 946 and certain memory 936 components. The application programs 1054 are illustrative of the programs that implement the various features of the data processing system 900 included a system in accordance with some embodiments of the present inventive concept and preferably include at least one application that supports operations according to some embodiments of the present inventive concept. Finally, the data 1056 represents the static and dynamic data used by the application programs 1054, the operating system 1055, the I/O device drivers 1058, and other software programs that may reside in the memory 936.

As illustrated in FIG. 10, the data 1056 according to some embodiments of the present inventive concept may include calibration data 1066, position data 1061, location data 1063, location map data 1064 and metadata 1064. Although the data 1056 illustrated in FIG. 10 includes five different files 1066, 1061, 1063, 1064 and 1065 embodiments of the present inventive concept are not limited to this configuration. Two or more files may be combined to make a single file; a single file may be split into two or more files and the like without departing from the scope of the present inventive concept.

As further illustrated in FIG. 10, the application programs 1054 may include a calibration module 1051, a location module 1052 and a map generating module 1053 in accordance with some embodiments of the inventive concept. While the present inventive concept is illustrated, for example, with reference to the calibration module 1051, the location module 1052 and the map generating module 1053 being application programs in FIG. 10, as will be appreciated by those of skill in the art, other configurations may also be utilized while still benefiting from the teachings of the present inventive concept. For example, the calibration module 1051, the location module 1052 and the map generating module 1053 may also be incorporated into the operating system 1055 or other such logical division of the data processing system 900. Thus, the present inventive concept should not be construed as limited to the configuration of FIG. 10, but is intended to encompass any configuration capable of carrying out the operations described herein.

Furthermore, while the calibration module 1051, the location module 1052 and the map generating module 1053 are illustrated in a single data processing system, as will be appreciated by those of skill in the art, such functionality may be distributed across one or more data processing systems. Thus, the present inventive concept should not be construed as limited to the configuration illustrated in FIGS. 9 and 10, but may be provided by other arrangements and/or divisions of function between data processing systems.

Referring now to FIGS. 9 and 10, as discussed above, embodiments of the present inventive concept provide a system for creating a location map using antennas in a UWB network. After a plurality of antennas are positioned in the target environment, which could be an indoor or outdoor environment, the calibration module 1051 determines a position of each of a plurality of stationary antennas positioned in a target environment relative to one another 1066, 1061. Thus, the relative locations of each of the plurality of antenna are known before the location module 1052 proceeds. The location module 1052 obtains location measurements 1063 relative to a mobile device as it moves around the target environment. The mobile device may move around walls and furniture to establish location thereof. The map generating module 1053 generates a location map 1064 using the location measurements. The location map illustrates a path traveled by the mobile device relative to the plurality of stationary antennas. The location map is displayed on the display 1045 and the location map 1064 includes straight line segments corresponding to the path traveled by the mobile device.

A user may modify the location map using, for example, a user interface 944, which may include a stylus, keyboard or voice recognition system without departing from the scope of the present inventive concept. Thus, a user may manually edit the displayed location map to select, remove and/or reposition the straight line segments.

In some embodiments, the location module 1052 may assign locations of objects 1063 in the target environment on the location map and store assigned location information in metadata 1065 associated with the location map.

In some embodiments, the map generating module 1052 automatically determines map details, for example, the location of rooms or furniture, based on relative positioning of the straight line segments on the displayed location map. A visual map may be created using straight line segment data, line segment metadata and object location metadata.

In some embodiments, the location module 1052 marks the location map as the mobile device moves around the target environment to create metadata 1065 stored with the location map. The metadata may relate to physical features of the target environment.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed example embodiments of the inventive concept. Although specific terms are employed, they are used in a generic and descriptive sense only and not for purposes of limitation, the scope of the inventive concept being defined by the following claims.

What is claimed is:

1. A method for creating a location map using antennas in an ultra-wide band (UWB) network, the method comprising:
   positioning a plurality of stationary antennas in a target environment;
   determining a position of each of the plurality of stationary antennas relative to one another;
   obtaining location measurements relative to a mobile device as it moves around the target environment;
   generating a unique location map of the target environment using the location measurements, the location map being generated by illustrating a path traveled by the mobile device relative to the plurality of stationary antennas to provide the unique location map including representations of physical aspects of the target environment; and
   displaying the unique location map including straight line segments corresponding to the path traveled by the mobile device,
   wherein at least one of the positioning, determining, obtaining, generating and displaying are implemented by at least one processor.

2. The method of claim 1, further comprising manually editing the displayed location map to select, remove and/or reposition the straight line segments.

3. The method of claim 2, further comprising:
   assigning locations of objects in the target environment on the location map and storing assigned location information in metadata associated with the location map.

4. The method of claim 3, further comprising automatically determining map details based on relative positioning of the straight line segments on the displayed location map.

5. The method of claim 4, further comprising creating a visual map using straight line segment data, line segment metadata and object location metadata.

6. The method of claim 1, wherein generating is preceded by marking the location map as the mobile device moves around the target environment to create metadata stored with the location map.

7. The method of claim 6, wherein the metadata relates to physical features of the target environment.

8. The method of claim 1, wherein the target environment comprises one of an indoor environment and an outdoor environment.

9. The method of claim 1, wherein obtaining location measurements further comprises obtaining location measurements as the mobile device moves around walls, furnishings and other elements in the target environment.

10. The method of claim 1, wherein the mobile device is carried by a user and/or positioned on a remote controlled device and operated from a remote location.

11. A system for creating a location map using antennas in an ultra-wide band (UWB) network, the system including:
    a calibration module configured to determine a position of each of a plurality of stationary antennas positioned in a target environment relative to one another;
    a location module configured to obtain location measurements relative to a mobile device as it moves around the target environment;
    a map generating module configured to generate a unique location map of the target environment using the location measurements, the location map being generated by illustrating a path traveled by the mobile device relative to the plurality of stationary antennas to provide the unique location map including representations of physical aspects of the target environment; and
    a visual display configured to display the unique location map including straight line segments corresponding to the path traveled by the mobile device.

12. The system of claim 11, further comprising a user interface configured to allow a user to manually edit the displayed location map to select, remove and/or reposition the straight line segments.

13. The system of claim 12, wherein the location module is further configured to assign locations of objects in the target environment on the location map and store assigned location information in metadata associated with the location map.

14. The system of claim 13, wherein the map generating module is further configured to:
    automatically determine map details based on relative positioning of the straight line segments on the displayed location map; and
    create a visual map using straight line segment data, line segment metadata and object location metadata.

15. The system of claim 11, wherein the location module is further configured to mark the location map as the mobile device moves around the target environment to create metadata stored with the location map.

16. The system of claim 15, wherein the metadata relates to physical features of the target environment.

17. The system of claim 11, wherein the target environment comprises one of an indoor environment and an outdoor environment.

18. The system of claim 11, wherein the location module is further configured to obtain location measurements as the mobile device moves around walls, furnishings and other elements in the target environment.

19. A computer program product for creating a location map using antennas in an ultra-wide band (UWB) network, the computer program product comprising:
- a non-transitory computer readable storage medium having computer readable program code embodied in the medium, the computer readable program code comprising:
- computer readable program code to determine a position of each of a plurality of stationary antennas positioned in a target environment relative to one another;
- computer readable program code configured to obtain location measurements relative to a mobile device as it moves around the target environment;
- computer readable program code configured to generate a unique location map of the target environment using the location measurements, the location map being generated by illustrating a path traveled by the mobile device relative to the plurality of stationary antennas to provide the unique location map including representations of physical aspects of the target environment; and
- computer readable program code to display the unique location map including straight line segments corresponding to the path traveled by the mobile device.

20. The computer program product of claim 19, further comprising computer readable program code to create a visual map using straight line segment data, line segment metadata and object location metadata.

* * * * *